Patented July 27, 1943

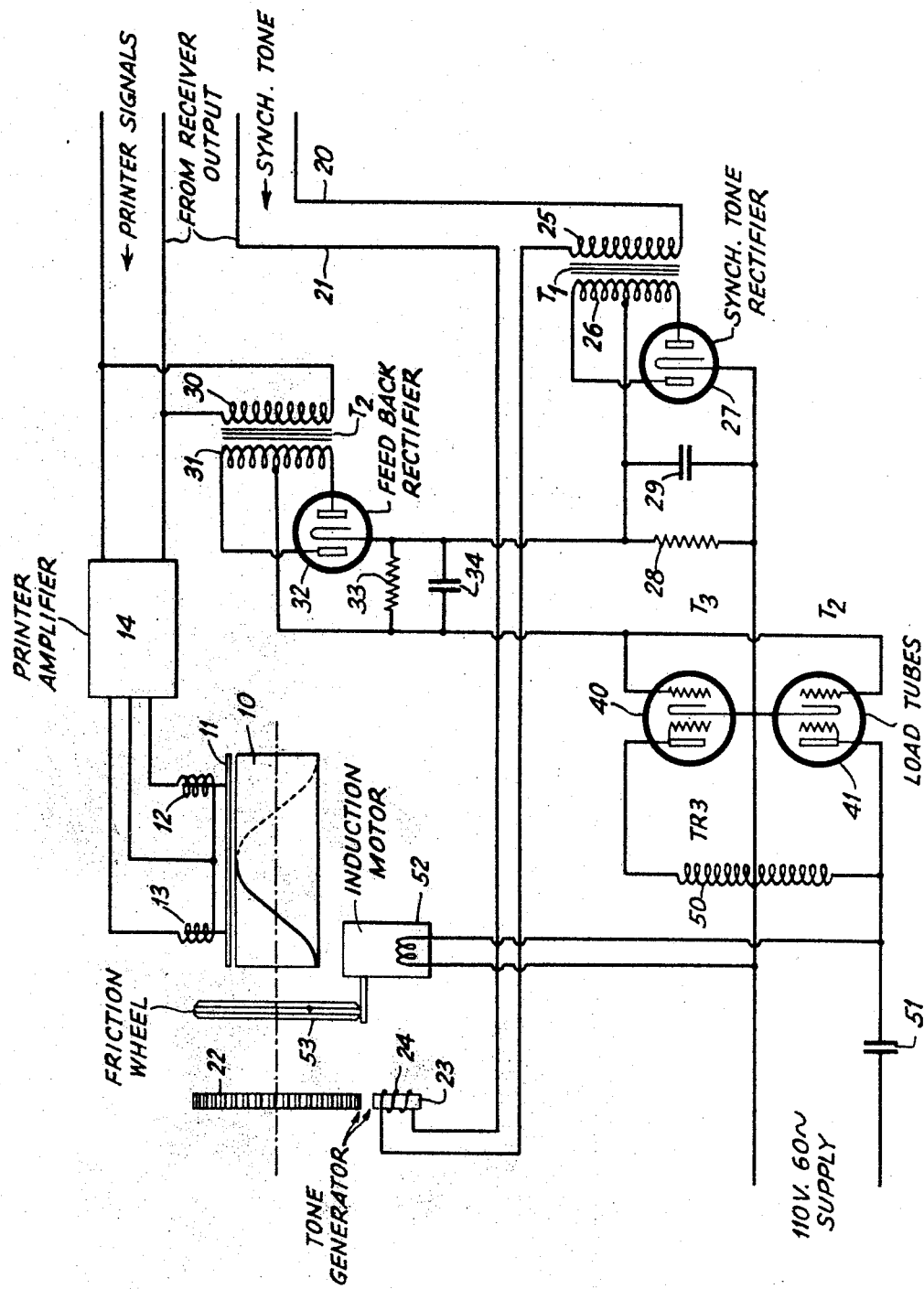

2,325,028

UNITED STATES PATENT OFFICE 2,325,028

MOTOR SYNCHRONIZING DEVICE

Maurice Artzt, Haddonfield, N. J., assignor to Radio Corporation of America, a corporation of Delaware Application November 28, 1941, Serial No. 420,799

9 Claims. (Cl. 172—239)

My invention relates broadly to apparatus for measuring and utilizing the relative time of occurrence of a plurality of electrical waves, and more broadly to utilization of such waves for the purpose of synchronizing dynamic devices.

It has been found that the use of an induction motor for driving facsimile scanning apparatus gives satisfactory and desirable results. In systems of this nature it has been customary heretofore to transmit an electrical wave or pulse in the interval occurring between the scansion of successive lines for synchronizing purposes. This signal may be compared with a locally generated signal for the purpose of determining the relative phase relationships between the transmitter and the receiver. If the phase relationships are correct, that is to say, the two devices are in synchronism, there is no necessity for changing the speed of the driving motor. On the other hand, if the phase relationships are not correct, then the speed of the driving motor must be either advanced or decreased, depending upon whether it is too great or too small. It is, therefore, one of the objects of my invention to provide a device for controlling the speed of an induction motor in accordance with comparison values between a locally generated wave and a received synchronizing signal.

In my co-pending application Serial No. 420,583, filed November 26, 1941, there is illustrated a synchronizing system in which the frequency of the wave supplied to the induction motor in a system as outlined hereinbefore has been altered in accordance with the comparison values between an incoming synchronizing signal and a locally generated signal. It is not always desirable nor convenient to alter the frequency supplied to the motor since considerable power amplification is needed in order to furnish energy for driving the motor. Accordingly, it is one of the objects of my present arrangement to provide a device in which the frequency of the energy applied to a motor is maintained substantially constant while the speed of the motor is changed in accordance with the phase relationships between a received synchronizing signal and a locally generated signal.

It has been found that an arrangement of the nature hereinafter to be set forth when used in conjunction with facsimile apparatus provides an arrangement in which there is a minimum amount of hunting of the motor. Accordingly, it is another of the objects of my invention to provide a device of the nature hereinafter to be described in which hunting will be minimized.

In accordance with one arrangement of my invention, the voltage supply to a driving motor is varied in accordance with the phase relationship between an incoming synchronizing signal and a locally generated signal, and accordingly it is another of the objects of my invention to provide a device of the character to be hereinafter described in which accurate synchronism may be established and maintained between a plurality of dynamic elements in accordance with the phase relationships between a locally generated signal and a received synchronizing signal.

My invention, in general, contemplates utilizing a first developed recurrent wave form and utilizing a locally generated second recurrent wave form in order to provide a comparison of the phase of the two wave forms. A signal is developed which is indicative of the comparison between the two recurring wave forms and this signal is rectified to form a direct current pulse. In accordance with this invention a resonant circuit is provided in the output of a thermionic arrangement onto which the direct current pulse is impressed, the resonant arrangement being connected to the ordinary supply line for a driving motor, which may be utilized to run a facsimile scansion apparatus. The motor circuit is also connected across the supply line and the voltage furnished to the motor varies in accordance with the voltage across at least a portion of the resonant circuit, the latter voltage being dependent on the value of the direct current pulse supplied to the thermionic arrangements.

My invention will be understood best by reference to the single figure of the drawing, which shows one embodiment thereof.

Referring to the figure, a drum 10 having a spirally ridged element wound about the periphery thereof has positioned immediately adjacent thereto a presser bar 11 with actuating coils 12 and 13, onto which are impressed signals representative of an optical image to be reproduced, and which have been received by facsimile apparatus and passed through a printer amplifier 14. Since all of this apparatus is known per se, and is fully described in my Patent No. Re. 20,152, dated October 27, 1936, and further, since this particular unit per se does not comprise the present invention, this is not described in detail.

The synchronizing tone is received and separated from the signals representative of the optical image by well known means and is impressed onto conductors 20 and 21. On the same shaft with the drum 10 is the toothed member 22 of a tone generator having the magnetic element 23 thereof positioned immediately adjacent thereto, the latter having wound thereabout a pick-up coil member 24. The conductor 20 is connected to one side of the primary 25 of a transformer $T_1$ and the other terminal thereof is connected to the pick-up coil 24. Thus it will be seen that the synchronizing tone and the pulses developed within the pick-up coil 24 by the passage of the teeth of the tone generator wheel through the magnetic field in the proximity of the magnet 23 are combined, and the combined signal which is dependent on the phase relationship between the synchronizing tone and the locally generated tone will be passed from the primary to the secondary 26 of the transformer $T_1$. The output from the secondary of the transformer is impressed onto a full wave rectifier 27 having a time constant circuit comprising resistance 28 and condenser 29 connected in the output circuit thereof. Therefore, the amplitude of the signal or pulse in the time constant circuit is dependent on the phase relationship between the synchronizing tone and the locally generated tone. Connected across the leads running to the printer amplifier 14 is the primary 30 of a transformer $T_2$ having a secondary 31. The pulses of the primary 30 are impressed through the secondary 31 onto a full wave rectifier 32, the latter having connected in the output thereof a time constant circuit comprising resistance 33 and condenser 34. One terminal of the latter time constant circuit is connected to one terminal of the time constant circuit comprising the resistance 28 and condenser 29. The other terminal of the time constant circuit comprising resistor 33 and condenser 34 is connected to a grid of thermionic tubes 40 and 41, the cathode of tube 27 being connected to the time constant circuit comprising resistor 28 and condenser 29 and to the cathode of tubes 40 and 41. Connected serially with the voltage supply and with the inductance 50, the latter being connected in the output circuit of the two tubes 40 and 41, is a condenser 51. Shunted across the voltage supply line is an induction motor 52, the motor driving drum 10 through the friction wheel 53.

It will be appreciated that when the apparatus is running synchronously with the transmitting apparatus the phase relationships between the received synchronizing tone and the locally generated tone will be constant, and therefore the voltage pulses occurring across the time constant circuit 28, 29 will be of substantially constant amplitude. On the other hand, as the machines diverge from a synchronous relationship the phase relationship between the synchronizing tone and the locally generated tone will change, and in this particular case the motor is tuned to a higher voltage than the normal 110 volt supply by the capacitor 51, and the tubes 40 and 41, then drawing load from the inductance 50, vary the effectiveness of this tuning. When the tubes draw full load the motor tuning is less effective and the motor voltage is then about 90 volts, and it will be appreciated that the tubes will draw more load as the phase of the synchronizing tone and the locally generated tone pulls closer together, or, in other words, the motor 52 speeds up. Since normally there is a difference in phase between these two tones, it will be appreciated that the speeding up of the motor will cause such a pulling in the phase of the two waves, with the attendant result that the motor voltage will be decreased due to the tubes 40 and 41 drawing more current. The relative wave forms have been shown in the drawing in my co-pending application Serial No. 420,583, filed November 26, 1941. In the feed-back taking place through tube 32 and transformer $T_2$ additional control is applied to the grids of tubes 40 and 41 by the rectified signal from the printer amplifier which is impressed on resistor 33. This additional is of a correct value to increase the motor voltage by the necessary amount to maintain correct speed as the printer load increases. As the printer signals increase for black, this correction increases the motor voltage by decreasing the load effect of the two tubes 40 and 41. The feed back improves operation and lowers hunting of the motor back and forth from a true synchronous relationship.

The friction reduction wheel is adjusted in ratio to drive the recorder drum 10 at correct speed when the motor is operating from about 120 volts, assuming that the range of voltages controlled runs from about 90 to 150. The direct current generated and impressed across resistor 28 will tend to vary the motor voltage up or down to hold this correct speed. Synchronism has been absolute over fairly wide limits.

It will be appreciated that there may be departures from the particular showing of this invention which will still fall fairly within the spirit and scope of my invention, and accordingly I claim all such departures which come within the provisions of the hereinafter appended claims.

What I claim is:

1. Apparatus for controlling the speed of a motor driving a load in accordance with the phase relationships between a plurality of electrical waves comprising means for developing a signal representative of the phase difference between the electrical waves, means for controlling the voltage impressed onto said motor in accordance with the value of said developed signal, and independent means for further controlling said voltage in accordance with the variation of said load.

2. Apparatus for controlling the speed of a motor driving a load in accordance with the phase relationships between a plurality of electrical waves comprising means for combining said electrical waves, means for storing energy in accordance with the values of said combined waves, means for controlling the voltage impressed onto said motor in accordance with the value of said stored energy, and independent means for further controlling said voltage in accordance with the variation of said load.

3. Apparatus for controlling the speed of a motor driving a load in accordance with the phase relationships between a plurality of electrical waves comprising means for obtaining a rectified signal proportional to the values of the combined electrical waves, means for controlling the voltage impressed onto the motor in accordance with the values of said rectified signal, and independent means for further controlling said voltage in accordance with the variation of said load.

4. Apparatus in accordance with claim 3, wherein there is provided in addition means for storing energy of a value proportional to the rectified signal, and wherein the voltage applied to said motor varies in accordance with the value of said stored energy.

5. In a synchronizing apparatus wherein the apparatus to be operated synchronously is driven by motor means, means to control the speed of the motor to run synchronously, and auxiliary means for affecting the speed of operation of said motor in accordance with variations in the load on said motor driven means.

6. In a synchronizing system for synchronizing the operation of a plurality of dyanmic elements, and wherein signals are received which are indicative of the phase and speed of at least one of said dynamic elements, means for locally generating a signal representative of the speed and phase of the dynamic element to be synchronized, means for comparing said received signal with said locally generated signal, means for affecting the driving force supplied to said dynamic element in accordance with the comparison value of the compared signals and supplementary means for independently controlling the driving force in accordance with the variation of load imposed upon the said dynamic element.

7. In a synchronizing system for synchronizing the operation of a first electric motor driving a load with that of a second electric motor, and wherein signals are available representative of the speed and phase of operation of said second motor, means for generating a signal proportional to the speed and phase of said first electric motor, means for comparing the sets of signals representative of the speed and phase of each of the motors, means for controlling the voltage impressed onto said first electric motor in accordance with the comparison of the two sets of developed signals, and independent means for further controlling said voltage in accordance with the variation of said load.

8. In a synchronizing system for synchronizing the operation of a first electric motor driving a load with that of a second electric motor, and wherein signals are available representative of the speed and phase of operation of said second motor, means for generating a signal representative of the speed and phase of said first electric motor, means for developing a signal representative of the rectified value of the combined developed signals, means for controlling the voltage impressed onto said electric motor in accordance with the value of said latter developed signal, and independent means for further controlling said voltage in accordance with the variation of said load.

9. Apparatus in accordance with claim 8, wherein there is provided in addition means for storing energy in accordance with the value of the signal representative of the rectified value of the combined electric waves, and wherein said stored energy affects the voltage impressed onto the first electric motor.

MAURICE ARTZT.